(12) United States Patent
Bricout (10) Patent No.: US 8,183,308 B2
(45) Date of Patent: May 22, 2012

(54) ROAD MARKING PRODUCTS WITH SELF-CLEANING PHOTOCATALYTIC PROPERTIES AND WITH A RENEWABLE HYPERHYDROPHILIC SURFACE

(75) Inventor: Xavier Bricout, Voisins le Bretonneux (FR)

(73) Assignee: Colas, Boulogne-Billancourt (FR)

( * ) Notice: Subject to any disclaimer, the term of this patent is extended or adjusted under 35 U.S.C. 154(b) by 0 days.

(21) Appl. No.: 12/488,189

(22) Filed: Jun. 19, 2009

(65) Prior Publication Data
US 2010/0010117 A1  Jan. 14, 2010

(30) Foreign Application Priority Data
Jun. 20, 2008  (FR) ..................................... 08 54110

(51) Int. Cl.
*C08J 5/14* (2006.01)
(52) U.S. Cl. ........................................ 523/150; 523/172
(58) Field of Classification Search .................. 523/150, 523/172
See application file for complete search history.

(56) References Cited

U.S. PATENT DOCUMENTS

| 4,025,476 A | 5/1977 | Miller |
| 4,058,641 A | 11/1977 | Hnojewyj |
| 4,296,006 A * | 10/1981 | Bugdahl et al. ............... 523/172 |
| 5,296,300 A * | 3/1994 | Carey et al. .................... 428/457 |
| 5,445,754 A * | 8/1995 | Nelson .............................. 252/62 |
| 5,824,734 A * | 10/1998 | Yang .............................. 524/555 |
| 6,084,026 A * | 7/2000 | Jamasbi ......................... 524/590 |
| 6,689,824 B2 | 2/2004 | Friel |

FOREIGN PATENT DOCUMENTS

| EP | 1559753 | 8/2005 |
| FR | 2326461 | 4/1977 |
| FR | 2824846 | 11/2002 |
| WO | 9707069 | 2/1997 |
| WO | 9920701 | 4/1999 |
| WO | 0160929 | 8/2001 |

OTHER PUBLICATIONS

Priority Search Report dated Feb. 5, 2009, in Priority application.

* cited by examiner

*Primary Examiner* — Doris Lee
(74) *Attorney, Agent, or Firm* — Young & Thompson (57) ABSTRACT

A road marking composition includes by weight, based on the composition total weight: from 5 to 50% of an organic base binder including a resin selected from homopolymers or copolymers derived from vinylic, acrylic or methacrylic monomers, natural or synthetic resins that are soluble in alcohol or in optionally modified oils, especially plant derivative resins, cellulose resins, petroleum resins, polyureas, polyesters and polyethers, except alkyd resins; from 1 to 40% of pigments amongst which from 1 to 100% of the pigment total content is crystallized titanium dioxide in the anatase for; and from 10 to 84% of fillers. A road marking product including the road marking composition and microbeads and/or anti-skid materials is also disclosed.

19 Claims, 3 Drawing Sheets

FIGURE 5

ROAD MARKING PRODUCTS WITH SELF-CLEANING PHOTOCATALYTIC PROPERTIES AND WITH A RENEWABLE HYPERHYDROPHILIC SURFACE

BACKGROUND OF THE INVENTION

1. Field of the Invention

The present invention relates to a road marking composition and to a road marking product comprising in addition to said composition, glass beads and/or anti-skid materials. The road marking composition has photocatalytic properties which, once applied onto a support, provide the same with special characteristics such as self-cleaning properties and a renewable hyperhydrophilic surface. The present invention also relates to the use of anatase type titanium dioxide in a road marking composition or product with a renewable hyperhydrophilic surface.

2. Discussion of the Related Art

A road marking product, whether it lies in either a horizontal or a vertical plane, because of its function undergoes local climatic conditions such as variations in temperature, exposure to ultraviolet radiation (UV) and to pollutants (rain, organic and mineral dust). As a consequence thereof, said road marking product gradually loses its fundamental properties which are the day visibility characterized by the luminance value ($Q_D$), the night visibility characterized by the retroreflection ($R_L$) and the marking adherence characterized by the skid resistance (SRT).

Dirt collection negatively affects the marking product colorimetry thus resulting in a loss of cognitive perception for the driver or the user. Indeed, such dirt collection, when deposited onto the glass bead and especially when accumulated into the voids between the glass beads and/or between the anti-skid materials, is "blocked" and partially covers the surface of the beads. As a result, this leads to a high decrease in marking visibility and in particular to a loss of retroreflection that is detrimental to the driver.

Moreover, dirt collection and abrasive wear typically associated with the road traffic cause the road marking product surface to polish, leading to a very high decrease in the skid resistance coefficient, with serious consequences on the road user safety, whether they are motorcyclists, or in particular pedestrians.

Road marking compositions traditionally comprise a binder, pigments, fillers and additives. The use of titanium dioxide as a pigment in the road paints is known. Titanium dioxide exists in various allotropic forms, amongst which the best known are rutile, anatase and brookite. Anatase and rutile type titanium dioxide have a photocatalytic activity. However, the anatase form is much more active than the rutile form.

The photocatalytic activity may be defined as follows. Titanium dioxide ($TiO_2$) is a semi-conductive oxide known for its photocatalytic properties. Indeed, "electron-hole" pairs are photogenerated when such material is submitted to a radiation with a wavelength shorter than 400 nm, i.e. when submitted to a natural radiation (sun) or to an artificial radiation exposure (lamp).

These "electron-hole" pairs react with oxygen, ambient air moisture and hydroxyl moieties or organic products adsorbed onto the titanium dioxide surface and produce radicals, and especially strongly oxidizing superoxide and hydroxyl radicals. The photocatalysis therefore enables to break down organic molecules on the titanium dioxide surface, through the formation of radicals which will initiate the covalent bound breakage. Crystallized titanium dioxide in the anatase form, because of its photocatalytic activity, catalyzes the organic compound oxidation.

Titanium dioxide photocatalytic properties have been used in various applications. Most of studies about $TiO_2$ photocatalysis deal with the mineralization of exhaust gas and how to treat air or water.

The patent WO 97/07069 also describes a self-cleaning glass produced by depositing an optically transparent and abrasion-resistant coating film based upon a photocatalyst which may be anatase type titanium dioxide. Following an air and light exposure, the film, thanks to its photocatalytic properties, prevents dirt and contaminating particles from adhering to the glass.

The patent FR 2 824 846 discloses a substrate comprising on a face thereof a coating possessing photocatalytic properties comprising crystallized titanium dioxide in the anatase form, in a substantially mineral binder comprising at least one semi-conductive metal oxide. The substrates described in this document are generally speaking any material used in buildings and in particular for glazing applications. Coatings thus enable providing the materials they cover with anti-fouling, fungicidal and bactericidal properties, optionally combined with hydrophilic, anti-fogging and optical properties.

Paints comprising photocatalytic compounds are also known, but such coatings, whether they are developed as exterior or even interior spill response products, generally attempt by any means to avoid the binder photodegradation. Such paints comprise silicone type mineral binders and not binders based on organic products, so as to prevent the binder itself from being photocatalytically degraded.

The patent application FR 2 326 461 discloses road marking compositions which may comprise as a pigment a combination of anatase and rutile type titanium dioxide. However, all the illustrative compositions comprising anatase type titanium dioxide are in a solvent phase and comprise as a binder a glycerophthalic alkyd resin and optionally chlorinated paraffins and rubber. Moreover, this document does not mention any special interesting use of anatase type titanium dioxide. This one is absolutely not used for its photocatalytic properties and thus a fortiori not for making a road marking product having a self-cleaning, hyperhydrophilic and renewable surface.

SUMMARY OF THE INVENTION

The applicant surprisingly discovered that using crystallized titanium dioxide in the anatase form in a road marking product comprising an organic type binder, makes it possible to obtain an excellent resistance of the adhesion and of the night and day visibility properties over time. According to the present invention, the road marking products and compositions herein poorly tend to accumulate dirt and possess auto-renewable surface properties.

In a first aspect, it is thus an object of the present invention to provide a road marking composition comprising, by weight, based on the composition total weight:

road marking composition comprising by weight, based on the composition total weight:

from 5 to 50%, preferably from 10 to 40% of an organic base binder comprising a resin selected from homopolymers or copolymers derived from vinylic, acrylic or methacrylic monomers, natural or synthetic resins that are soluble in alcohol or in optionally modified oils, especially plant derivative resins, cellulose resins, petroleum resins and coumarone-indene resins, polyureas, polyesters and polyethers, aminoplast resins (amino resins), phenoplasts (phenolic resins), and epoxy type esters, except alkyd resins, from 1 to 40%, preferably from 10 to 40% of pigments, amongst which from 1 to 100% of the pigment total content is crystallized titanium dioxide in the anatase form and from 10 to 84%, preferably at least 20% and even better from 30 to 84% of fillers.

The present invention further relates to a road marking product comprising said road marking composition and microbeads and/or anti-skid materials.

The present invention further relates to the use of anatase type titanium dioxide for making a road marking product comprising an organic type binder, having hyperhydrophilic and renewable surface properties.

BRIEF DESCRIPTION OF THE DRAWING FIGURES

FIG. 1.*a* illustrates a road marking product 1, formed from a road marking composition 2 and anti-skid materials 3 extending from the road marking product surface.

FIG. 1.*b* illustrates a road marking product after some vehicle-attributable road wear.

FIG. 1.*b* illustrates a renewed road marking product.

DETAILED DESCRIPTION OF THE INVENTION

The mechanisms underlying the present invention rely on two properties of the crystallized titanium dioxide in the anatase form. On the one hand, this one enables the photocatalytic degradation of the binder comprised in the road marking product; on the other hand, it makes the surface hyperhydrophilic.

Indeed, titanium dioxide has hyperhydrophilic properties when exposed to an ultraviolet radiation. The hydrophilic character of a material is measured through the wetting angle, that is to say the angle formed by a water droplet with the surface of the material. When titanium dioxide is exposed to an ultraviolet radiation, this angle becomes smaller until the droplet is fully spread. The surface then becomes hyperhydrophilic and there is no water retention.

Figure 1:
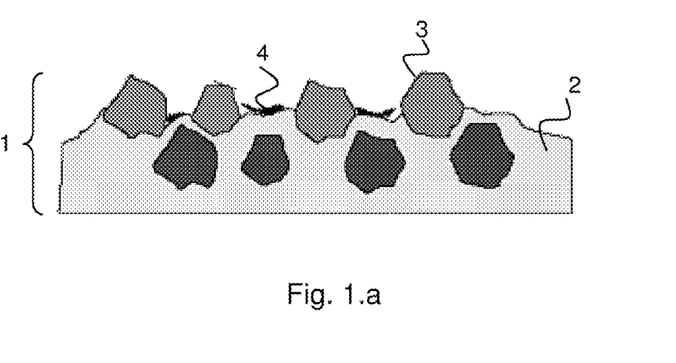

Typically, a road marking product comprises superficially anti-skid materials and/or glass beads which provide it with high skid resistance properties (high initial SRT coefficient). FIG. 1.*a* illustrates a road marking product 1, comprising a road marking composition 2 and the anti-skid materials 3 extending from the road marking product surface. As a drawback, the glass beads or anti-skid materials that are present retain dirt 4 because it is are "blocked" between the interstices of the anti-skid materials extending from the surface. Dirt accumulates on the surface and cannot be removed by the motor vehicle traffic.

When a traditional road marking product is used, after some vehicle-attributable road wear, a polishing phenomenon occurs. Such phenomenon is illustrated in FIG. 1.*b*. The skid resistance properties tend to decrease.

According to the present invention, due to exposure to the ultraviolet radiation, the organic binder contained in the road marking composition decomposes on the surface of the road marking product upon contacting the anatase type titanium dioxide and thus causes the dirt to separate. Concomitantly, the surface being hyperhydrophilic in nature, water spreads well onto the road marking surface and especially slides between the binder raveled surface and dirt. Such phenomenon helps dirt of various types to be removed therefrom, as well as the decomposed binder. Indeed, the water and vehicle traffic combined action enables the delamination and the removal of the whole decomposed binder and dirt.

Moreover, once the binder upper layer has been removed, the surface particles are not retained anymore and thus may be teared out before they become polished by the vehicle traffic. The surface condition of the road marking product, and thus the skid resistance properties thereof, are therefore renewed in this manner. Such phenomenon is illustrated in FIG. 1.*c*. The present invention not only makes it possible to clean the surface, but also to maintain a good performance as regards the skid resistance.

As opposed to known applications using anatase type titanium dioxide only concerned by the degradation of pollutants, the present invention not only aims at degrading dirt but also at superficially decomposing the binder. Indeed, dirt may be organic or mineral in nature, but above it is present in such an extent that the degradation thereof would require several months, or even years. By superficially decomposing the binder, both the delamination and thus the removal of any type of dirt is made possible, whatever its nature or size, as well as the removal of the surface deposited particles, thus preventing the polishing thereof. Surprisingly, this method makes it advantageously possible to renew the surface properties of the road marking product and in particular the skid resistance thereof (SRT).

The road marking product according to the present invention therefore keeps having a surface with a high luminance ratio, a high retroreflection and a high skid resistance over time.

The luminance ratio ($Q_d$) under diffused lighting defines the day visibility of a road marking, in the way it is perceived by a driver at a distance of 30 meters. This ratio is the expression of the whiteness of the marking. It is defined according to the NF EN 1436 standard. The measure is expressed as millicandelas per lux per square meter ($mcd/Lux/m^2$).

Night retroreflection ($R_L$) under dry or wet, or rainy weather conditions, defines the night visibility of the road marking, in the way it is perceived by a driver, at a distance of 30 meters, using the vehicle lights. It is defined according to the NF EN 1436 standard. The measure is expressed as millicandelas per lux per square meter ($mcd/Lux/m^2$).

The skid resistance SRT defines the adhesion of a marking on the road pavement. It is defined according to the NF EN 1436 standard.

In addition, the road marking composition according to the present invention has the following characteristics, to be considered either alone or in combination:

crystallized titanium dioxide in the anatase form represents by weight, based on the pigment total weight, from 2 to 75%, preferably from 10 to 40% and more preferably from 20 to 30%, the composition comprises a mixture of crystallized titanium dioxide in the anatase form and of crystallized titanium dioxide in the rutile form, the amounts by weight of crystallized titanium dioxide in the rutile form based on the composition total weight range from 1 to 40%, preferably from 5 to 22%, and more preferably from 9 to 18%, the composition comprises by weight, based on the composition total weight from 1 to 6%, preferably from 2 to 5% and more preferably from 3.5 to 4.5% of anatase type titanium dioxide, the organic base binder is free from any solvent (if thermoplastic), in a water phase or in an organic solvent phase, preferably in the water phase, the composition may comprise, in addition to the solvents associated with the organic base binder, one or more solvent(s) that may be the same as or different from those contained in the organic base binder, the organic base binder in a water phase is an emulsion comprising from 30 to 70% of dry matter, the organic base binder is preferably an emulsion comprising at least one acrylic polymer, when the composition is in a water phase, it comprises less than 10% by weight of solvent of organic nature, preferably less than 5% by weight, based on the composition total weight, when the composition is in a solvent phase, the solvent amounts by weight, based on the composition total weight range from 10 to 50%, when the composition has no solvent, the binder amounts range from 5 to 30%, the fillers are selected from calcium carbonate, crystallized or amorphous silica, fibers or laminates (fillers in the form of talc type lamellas), the composition comprises by weight, based on the total weight:
from 10 to 50%, preferably from 10 to 40% and even better+from 30 to 40% of an organic base binder,
from 5 to 25%, preferably, from 10 to 20% of pigments,
from 20 to 60%, preferably, from 35 to 45% of fillers, the filler total amount, which represents the total additive amounts by weight of fillers+pigments based on the composition total weight, is higher than or equal to 50%, preferably ranging from 50% to 60%, the solid matter content, by weight, based on the composition total weight is higher than 60%, and preferably ranging from 70 to 80%, the composition further comprises one or more additive(s) selected from coalescing agents, antifoaming agents, thickeners, surfactants and dispersing agents, the composition comprises from 0 to 4% by weight of additives based on the composition total weight, preferably from 1 to 4% by weight.

The present invention further relates to the use of anatase type titanium dioxide in a road marking composition or a road marking product comprising an organic type binder, to provide the composition or the road marking product with hyperhydrophilic and renewable surface properties.

The solid matter content, as defined herein, means the total dry weight of pigments, fillers and binder. If additives are comprised, the weight thereof is not taken into account in the total dry weight calculation.

Crystallized titanium dioxide in the anatase form has high whiteness resistance characteristics over time because of its photocatalytic properties. Anatase type titanium dioxide with a specific surface area (BET) higher than 250 $m^2/g$ will be preferably used. This type of product is commercially available. To be mentioned are especially $TiO_2$ anatase Hombikat UV100 from the Sachtleben company, or P25 from Degussa.

The composition of the invention preferably comprises one or more pigment(s) other than anatase type titanium dioxide. These pigments may be mineral or organic in nature and preferably with a very small particle size (typically <1 μm). Because of the intended application, the most preferred pigments are white and yellow pigments.

Suitable mineral pigments which provide the white color include the other allotropic forms of titanium dioxide and more particularly rutile type titanium dioxide ($TiO_2$). Rutile grade titanium dioxide is commercially available especially under the trade name Tioxyde® TR92 or TIPURE® R902.

To be mentioned as white mineral pigments are also lithopone ($BaSO_4$, ZnS), and zinc oxide.

Suitable mineral pigments which provide the yellow color include bismuth/vanadate-based yellow (BiOV), chrome titanate/antimony-based yellow, nickel titanate/antimony-based yellow, iron oxide, zinc yellow, chrome yellow, lead chromate, and cadmium yellow.

Amongst suitable organic pigments, the most often used compounds include phthalocyanine derivatives, azo derivatives (benzidine, toluidine, and dinitraniline derivatives), isoindoline or isoindolinone pigments, di-keto-pyrrolopyrrole-based pigments, anthraquinone derivatives, perylene derivatives or thioindigo derivatives, quinacridone pigments and dioxazine pigments. Suitable examples of a yellow colored organic pigment are benzimidazolone, quinazolinediones, quinoxalinediones, aryl amide, and derivatives thereof.

The organic base binder according to the present invention comprises a resin selected from homopolymers or copolymers derived from vinylic, acrylic or methacrylic monomers, natural or synthetic resins that are soluble in alcohol or in optionally modified oils, especially plant derivative resins, cellulosic resins, petroleum resins and coumarone-indene resins, polyureas, polyesters and polyethers, aminoplast resins (amino resins), phenoplasts (phenolic resins), and epoxy type esters, except alkyd resins.

The suitable resins to be used in the present invention are very well known products. These products are moreover listed in the AFNOR NF T 36-005 standard which relates to a paint, varnish and related product classification.

Alkyd resins which are precisely excluded from the present invention correspond in the NF T 36-005 classification standard to family 1, class 4. Such resins are prepared through polyol esterification (glycerol, pentaerythritol) with phthalic diacids (phthalic anhydride, isophthalic or terephthalic acids) and modified with unsaturated fatty acids or oils. Mostly used fatty acids in the synthesis are derived from drying or semi-drying oils. These resins are referred to as glycerophthalic resins.

Vinylic, acrylic, methacrylic or copolymeric resins to be suitably used in the present invention correspond in the NF T 36-005 standard classification to family 1, class 7. Such resins are for example described in the U.S. Pat. No. 6,689,824 and the patent application WO 01/60929. Suitable examples of vinylic, acrylic or methacrylic resins include methyl or ethyl polyacrylates or polymethacrylates, a polyvinyl acetate solution in a solvent combination. Suitable examples of vinylic, acrylic or methacrylic copolymer or terpolymer-based resins include styrene/acrylic, vinyl acetate/acrylic, ethylene/vinyl acetate, vinyl chloride/vinyl acetate or propionate/acrylate, vinyl acetate/vinyl versatate, vinyl acetate/vinyl maleate, epoxy acrylic and acrylic/aminoplast combinations.

Natural or synthetic resins soluble in alcohol or in optionally modified oils to be suitably used in the present invention correspond in the NF T 36-005 standard classification to family 1, class 10a. This class includes gums, hard or soft lacquers, copal resins and rosins. Plant derivative resins are preferably used, such as optionally modified rosins (esterified, maleized, hydrogenated etc.). These resins may be used with oils, preferably vegetable oils. A mixture of rosin resin and vegetable oil is preferably used.

Cellulosic resins to be suitably used in the present invention correspond in the NF T 36-005 classification standard to family 1, class 5. Cellulosic resins comprise nitrocellulosic resins, cellulose acetate, cellulose acetobutyrate; cellulose ethers and esters. These resins may be combined with other binders such as amine, vinylic, acrylic, maleic or abietophenolic resins, rosin esters, natural gums, polyurethanes, polyesters.

Petroleum resins (hydrocarbon resins) and coumarone-indene resins to be suitably used in the present invention correspond in the NF T 36-005 classification standard to family 1, class 10h. These resins are typically resins prepared from hydrocarbon fractions resulting from naphtha steam cracking, such as aromatic fractions comprising monomers selected from styrene and derivatives thereof, vinyl toluenes and allyl benzene and/or aliphatic fractions comprising a monomer having 5 or 6 carbon atoms such as cyclopentadiene and derivatives thereof and cyclohexadiene. Hydrocarbon resins marketed under the trade name ESCOREZ™ by the Exxon Chem company, which are very frequently used in hot marking products, are to be mentioned as a suitable example.

Aminoplast resins (amino resins), phenoplasts (phenolic resins), and ester-epoxy resins to be suitably used in the present invention respectively correspond in the NF T 36-005 classification standard to family 1, class 10d, 10e, 10g. The most frequently used amino resins are prepared by polycondensating formaldehyde (formol) and urea or melamine. These phenolic resins are prepared by polycondensating formaldehyde and phenols.

Polyesters and polyethers to be suitably used in the present invention correspond in the NF T 36-005 classification standard to family 1, class 6. This class includes polyurethanes (class 6a), polyepoxides (class 6b), saturated polyesters (class 5c) and unsaturated polyesters (class 6d).

Polyurethanes are prepared by reacting a polyisocyanate with a hydroxylated compound which may be a polyol, a polyester, an acrylic resin or, more seldom, atmospheric moisture.

Epoxy resins are prepared by reacting epichlorohydrin with a hydroxylated compound (bisphenol A, F or a combination of both), to which a hardening agent has been added. Said hardening agent is a product that can react, either with epichlorohydrin, or with bisphenol. In the first case, hardening agents that are used are polyamines (for example 4,4'-diaminodiphenyl methane), acids (for example hexahydrophthalic acid), anhydrides, novolacs (thermoplastic phenolic resins), polyamides or polyaminoamides. In the second case, the hardening agent is either an organic acid, or a polyisocyanate. To be mentioned as suitable examples are epoxy-polyamine, epoxy-polyamide, epoxy-polyurethane, epoxy-urea-formol, epoxy-melanine-formol type resins.

Polyesters are subdivided into saturated polyesters and unsaturated polyesters. Unsaturated result from a reaction of a diacid with a dialcohol. The linearly structured resulting compound is brought in solution in a copolymerizable vinyl monomer, traditionally styrene. The mixture is hardened by adding a catalyst. Saturated polyesters, sometimes improperly called oil-free alkyds, are prepared by esterifying polyols with a mixture composed of a phthalic anhydride and an aliphatic or aromatic diacid.

The compositions according to the present invention may be in the solvent or in the water phase, or be devoid of solvent where thermoplastic compositions are used. Compositions are preferably in a water phase comprising binders which are in the water phase.

In the context of the invention, the compositions in the solvent phase mainly comprise organic solvents for bringing the binders they contain into solution (or dispersion). The solvents are for example selected from butyl or ethyl acetate, ketones, toluene, xylene, ethanol, propanol, solvents derived from renewable resources of vegetable or animal origin such as Vegeflux® and bioethanol.

In the context of the invention, the compositions in a water phase comprise a mixture composed of water and solvent (hereafter called "liquid part"). A composition is considered to be in a water phase if it comprises at least 60% by weight of water based on the composition liquid part total weight. A composition will be preferably used, comprising less than 30%, preferably less than 20% of organic solvent based on the composition liquid part total weight. A further preferred composition comprises less than 10%, preferably less than 5% by weight of organic solvent based on the composition total weight. When using preferably such composition, that is to say when using less volatile organic compounds which evaporate upon drying, the impact onto the air, but also onto water and soils is substantially reduced.

According to a preferred embodiment of the invention, a composition in a water phase is used and preferably a composition comprising a binder of the acrylic emulsion type in the water phase. Where the binder is an emulsion in the water phase, its water content ranges from 30 to 70% by weight, based on the binder total weight.

The organic base binder thus comprises the organic binder strictly speaking or a resin, and a solvent which may be water. Therefore, the compositions of the present invention comprise from 5 to 20% by weight of an organic resin.

The fillers enable to adjust some mechanical, chemical, electrical or rheological characteristics. Fillers originating from mineral sources are preferably used. The most often used fillers include sulfates, silicates, carbonates such as calcium carbonate ($CaCO_3$) and dolomite ($CaCO_3$, $MgCO_3$), oxides such as amorphous or crystallized silica ($SiO_2$). Laminates or fibers may also be suitably used.

The marking compositions according to the present invention may be used for making various marking products such as a water- or solvent-containing road paint, a hot application or a cold application coating, a preformed road-marking strip.

Preferably, a road marking product of the road paint or hot application or cold application coating type, comprises in addition to said composition, glass beads and/or anti-skid materials.

The marking compositions according to the present invention are combined and kept under stirring as appropriate prior to being deposited onto the road pavement by using a coating machine fitted with a spray and a distributor system for example.

For example, a paint in a water or in a solvent phase is deposited in a liquid state or just after the application (fresh state) in an amount of from 200 to 1000 $g/m^2$.

Once the composition has been sprayed onto the surface, the reflective beads and/or the anti-skid materials may be immediately distributed in the composition, in order to fully imbed these materials into the composition. A commercially available traditional, coating device comprises a spray head for the composition and, associated therewith, a glass bead distributor, which works in a synchronized manner with the spray head for distributing the glass beads on the freshly deposited marking composition.

The glass or retroreflective beads have a refractive index of from 1.50 to 2.4, where the most often used have a refractive index of 1.52 and are derived from recycled glass. The particle size ranges from 100 to 1400, or may be of 2000 μm with ranges according to the EN 1423/1424 standard. The amount to be sprayed varies from 50 to 800 $g/m^2$ depending on the expected effect, size and thickness of the road marking product.

The anti-skid materials used by powder spraying shall have a hardness higher than 4 Mohs. These materials are selected from silica, glass grains, corundum and bauxite.

In a further embodiment of the present invention, the glass beads and/or the anti-skid materials are combined with the composition before its application onto the surface. Such process is called a "premix".

The anti-skid materials, when incorporated in a premix, are considered as a "traditional" filler, that is to say comprised in amounts ranging from 20 to 60%. The reflective beads that are incorporated in the premix are small in size and represent preferably from 10 to 50%.

The compositions according to the present invention may comprise in addition one or more traditional additive(s) selected from anti-foaming agents, dispersing agents, coalescing agents, thickeners and surfactants. The amounts of additives by weight based on the road marking composition total weight preferably range from 0 to 4%.

The cold applicable coatings are preferably used in the urban areas with an intensive road traffic, for making urban construction elements such as cross walks, lane droplet arrows, checkerboards, or structured products such as rumble strips, VNTP gutters (for night-time visibility with rainy weather).

Cold applicable coatings are preferably based on two-component type methacrylic resins or on single-component type aqueous resins.

Cold applicable coatings based on two-component type filled methacrylic resins comprise, by weight, based on the coating total weight:
20% of resin(s) and of plasticizer,
50% of pigment(s) and fillers,
30% of glass beads.

Cold applicable coatings based on single-component type filled aqueous resins comprise, by weight, based on the coating total weight:
from 25 to 35% of binder,
from 10 to 20% of pigment(s),
from 40 to 70% of fillers,
from 0 to 3% of cosolvents,
from 0 to 3% of various additives.

Hot applicable coatings are thermoplastic products that are solid at room temperature, the ball-ring temperature of which preferably ranges from 70 to 100° C. These products are deposited at temperatures ranging from 160 to 220° C. by spraying or flowing through a slot (method called "curtain coating" or "shoe coating" in the technical jargon).

Hot applicable coatings preferably comprise hydrocarbon resins and/or vegetable resins, pigments, fillers, glass beads, plasticizers, waxes and anti-sedimentation agents.

Hot applicable coatings are preferably used on free-ways and in very intensive road traffic areas.

Preformed road-marking strips are ready-to-use strips, which are generally self-adhesive or hot-melt. These strips comprise a PU film (polyurethane) which contains ceramic and glass beads, as well as pigments and fillers, lead on a pressure-sensitive adhesive.

As used herein, a "thickener" includes generally speaking any substance which added to the paint changes the rheological behavior thereof. Examples of thickeners to be suitably used in the present invention include natural thickeners, and those especially selected from natural gums, CMC (carboxymethyl celluloses) and HEC (hydroxyethyl celluloses), or selected from artificial thickeners, and especially selected from synthetic gums, HASE type acrylic thickeners (hydrophobically modified thickening emulsions in an alkaline medium (or Hydrophobically modified Alkali-Swellable Emulsions) or ASE type thickeners (thickening emulsions in an alkaline medium (or Alkali Soluble Emulsions), hydrophobically modified urethane thickeners (HEUR), polyethers, polyesters, polyvinylic alcohol (PVA) or PVP-based thickeners (polyvinylpyrrolidone), or other thickeners such as silica fume, attapulgite clay and other clays of other types, chelating agents. Hydrophobically modified urethane thickeners marketed under the trade names ACRYSOL® RM-825, ACRYSOL® RM-8W, ACRYSOL® RM-12W are to be mentioned especially.

Dispersing agents to be suitably used in the present invention include non ionic, anionic, and cationic dispersing agents such as 2-amino 2-methyl 1-propanol (AMP), dimethyl amino ethanol (DMAE), potassium tripolyphosphate (KTPP), trisodium polyphosphate (TSPP), citric acid and other carboxylic acids. Anionic polymers such as polycarboxylic acid based homopolymers and copolymers, for example, polyacrylic acid or polymethacrylic acid or maleic anhydride modified by various monomers such as styrene, acrylate or methacrylate esters, diisobutylene, and other hydrophilic or hydrophobic comonomers. Also included are the hereabove mentioned polymer salts, as well as their mixtures. The acrylic dispersing agent marketed by the COATEX company under the trade name COATEX® P90 is to be mentioned especially.

Suitable antifoaming agents include silicone fluid- and mineral oil-based anti-foaming agents. Formulations also exist based on hydrocarbons and non ionic surfactants such as the products marketed under the trade name FOAMASTER®.

Suitable coalescing agents include glycol ethers such as ethylene glycol, propylene glycol, 2,2,4-trimethyl-1,3-pentanediol monoisobutyrate (TEXANOL™).

Suitable surfactants are selected from cationic, anionic, and non ionic surfactants that are traditionally used in paint formulations. A non ionic surfactant is preferably used, and especially a polyethylene glycol ether and a fatty alcohol combination such as TERGITOL®.

The following examples illustrate the compositions of the present invention. All the amounts are expressed by weight.

EXAMPLES

I. Raw Materials

Organic binder: acrylic emulsion (solid content 50%) Fastrack® 2706 marketed by the Rhom and Haas company,
Pigments: Anatase type titanium dioxide: Hombikat® UV100 (100% anatase, specific surface area (BET): >300 $m^2/g$);
Rutile grade titanium dioxide: TIPURE® R902 marketed by the Dupont company,
Fillers: Calcium carbonate, Durcal® 5 from the OMYA company,
Additives: Coalescing agent: Texanol®
Antifoaming agent: Foamaster® 8034
Thickener: Acrysol® RM12W,
Surfactant: Tergitol® 15S40,
Acrylic dispersing agent: Coatex® P90.

II. Influence of the Anatase $TiO_2$ Content on the Viscosity

Such assay aims at evaluating the influence of the highly photocatalytic anatase $TiO_2$ content on the road marking composition properties. Compositions comprising various anatase and rutile $TiO_2$ contents were prepared. Anatase $TiO_2$ has a higher oil absorption than rutile $TiO_2$. The filler rate (filler and pigment total weight) decreases as the anatase $TiO_2$ amounts increase.

For evaluating the influence of the $TiO_2$ content, the following control composition was prepared:
Acrylic binder in the water phase: 35%
Rutile $TiO_2$: 17.98%
Fillers: 39%
Water: 2.5%
Cosolvent: 4.2%
Additives: 1.32%

The compositions 1 to 4 were thereafter prepared with various anatase titanium, rutile titanium and filler contents. The viscosity was measured using a Brookfield viscosimeter (spindle n°4, speed 10 rpm, product temperature 21° C., 1 day after production).

The resins were prepared by mixing the various components together in following order:
 adding the resin,
 then, if the following compounds are used, adding the antifoaming agent, then the surfactant, and thereafter the dispersing agent,
 adding the pigments,
 adding the fillers,
 then optionally the one or more solvent(s) and lastly the coalescing agent.

These aqueous road paints are intended to be sprayed with no air (airless method) using a machine.

Table 1 illustrates the various compositions prepared, as well as the viscosity obtained for each composition.

TABLE 1

Variation of the viscosity depending on the anatase type $TiO_2$ content.

| Formula | Control composition | Composition 1 | Composition 2 | Composition 3 | Composition 4 |
|---|---|---|---|---|---|
| % rutile type $TiO_2$ | 17.98 | 13.49 | 8.99 | 4.50 | 0 |
| % anatase type $TiO_2$ | 0 | 2.46 | 4.93 | 7.39 | 9.85 |
| Filler rate | 57.01 | 55.82 | 54.62 | 53.43 | 52.24 |
| Brookfields viscosity (mPa · s) | 2300 | 2630 | 4000 | 4600 | >14 000 |

Figure 2:
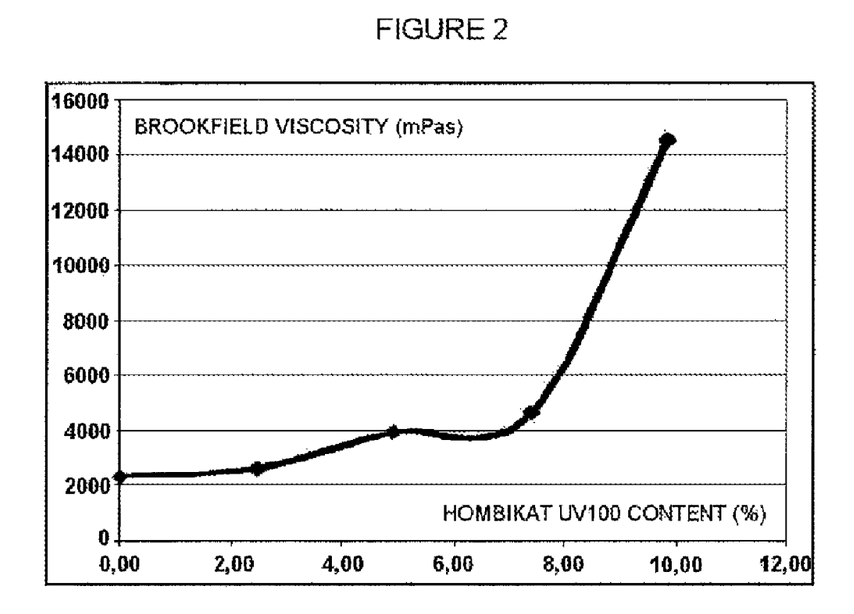
FIG. 2 illustrates the changes in viscosity depending on the anatase titanium dioxide content.

Table 1 and FIG. 2 which illustrate the changes in viscosity depending on the anatase type titanium dioxide content, show that the road marking composition has an optimum viscosity when the anatase type $TiO_2$ contents are lower than 6% by weight, based on the composition total weight, most preferably lower than 5% by weight, based on the composition total weight, which corresponds to 35% by weight of anatase titanium based on the pigment total weight.

The variation of the viscosity was also measured using a rheogram. The rheogram measures the evolution of the viscosity (mPa·s) depending on the shear value ($s^{-1}$) on a rheometer with a mobile cone/plane with a prescribed stress of the Rheostress 600 type from the thermo Electron company. The gradient varies from $10^{-4}$ to $10^3$ $s^{-1}$, which makes possible to evaluate the paint behavior during its lifetime as regards storage, transportation, blending, spraying and the leveling thereof once deposited onto the soil.

Figure 3:
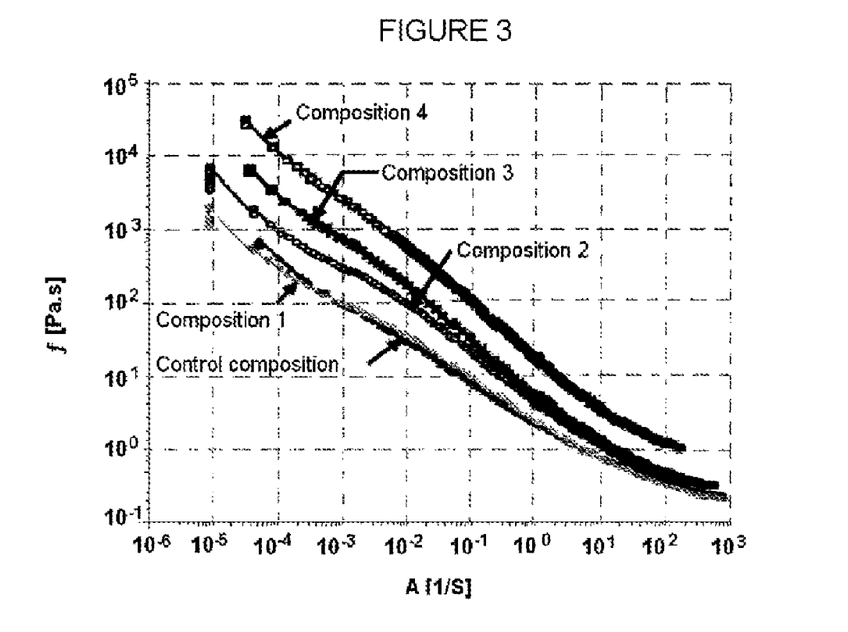
FIG. 3 illustrates the overall evolution of the viscosity whatever the shear value.

The measured rheogram illustrated in FIG. 3 confirms the overall evolution of the viscosity whatever the shear value. It can be observed that a mixture comprising 2.5% by weight of anatase type $TiO_2$ based on the composition total weight has the same rheogram as a composition comprising only rutile grade titanium dioxide. This corresponds to a composition comprising 15% by weight of anatase titanium based on the pigment total weight.

III. Influence of the Anatase Type $TiO_2$ Content on the Hiding Power

A. Hiding Power Measurement on a Leneta Chart Form 24B

Such measurement is made according to the NFT 30075 standard. The Leneta chart 24B possesses strips with a gradient extending from white (score 0) to black (score 6). The measurement consists in depositing various paint controlled thicknesses, then in measuring from which strip (scored from 1 to 6) the contrast becomes visible. 6 corresponds to a perfect hiding power, 3 is arbitrarily considered as the minimum for being used as a paint.

TABLE 2

Influence of the anatase type $TiO_2$ content on the hiding power

| Thickness when fresh (μm) | Control composition | Composition 1 | Composition 2 | Composition 3 | Composition 4 |
|---|---|---|---|---|---|
| 225 | 5 | 4 | 3 | 2 | 1 |
| 250 | 5 | 4 | 3 | 2 | 1 |
| 275 | 5 | 5 | 3 | 2 | 1 |
| 300 | 5 | 5 | 4 | 3 | 1 |
| 350 | 6 | 5 | 4 | 3 | 1 |
| 400 | 6 | 6 | 5 | 3 | 1 |

The anatase type titanium dioxide used has a nanoscale particle size which may affect the hiding power and therefore the retroreflection. The influence of the nanoscale size of the anatase type $TiO_2$ in fact relates to the rutile type $TiO_2$ extender power because it will tend to the rutile type $TiO_2$ particle separation, which will enable to better distribute the same through the matrix. Because of its nanoscale size, the anatase type $TiO_2$ has a poor opacifying power: it is translucent on light. This explains why it cannot be used without rutile type $TiO_2$, which is coarser and has a high refractive index.

The table hereunder clearly demonstrates that the composition possesses a good hiding power, even when applied in thin layers, with anatase type $TiO_2$ contents lower than or equal to 5%.

From 5% of anatase type titanium dioxide and therefore from filler content of 54.62%, the hiding power of the composition becomes insufficient in thin layers (300 μm, i.e. around 500 g/m²). Composition 4, only comprising anatase type $TiO_2$, has not a very good hiding power.

B. Hiding Power Measurement on a Contrast Chart Leneta 2A

The luminance ratio (Y) on a white background (YB) as opposed to black (YN) is measured. The higher the ratio (equal to or higher than 1), the higher the hiding power.

Such measurement is made according to the EN 1436 standard. The principle is the same as that explained hereabove, except that the measurement is carried out between a black background and a white background for a given thickness and that the measurement is made by a spectrocolorimeter by measuring the Y parameters and x and y tristimuli.

TABLE 3

Influence of the anatase type $TiO_2$ content on the hiding power

| Hiding power 250 μm fresh | Control composition | Composition 1 | Composition 2 | Composition 3 | Composition 4 |
|---|---|---|---|---|---|
| YB | 88.37 | 88.28 | 86.14 | 86.08 | 80.58 |
| YN | 88.41 | 87.17 | 87.05 | 82.27 | 71.97 |
| YN/YB | 1.005 | 0.987 | 1.011 | 0.956 | 0.893 |

It can thus be observed that the hiding power strongly decreases with compositions comprising more than 5% of anatase type titanium dioxide in a thin layer (250 μm).

IV. Influence on the Film Hardness

The Persoz hardness measurement consists in measuring the damping time of a pendulum resting by means of two steel beads on the film to be tested. Hardness is expressed in seconds, which corresponds to the oscillation number of the pendulum when inclined at an angle of 12° as related to the normal plane initially present and of 4° at the end of the assay (NFT 30-016 standard).

The assays were conducted on 400 μm-thick films. The measurements were effected on day 1, then on day 6, after drying at room temperature in laboratory, as well as after aging using a WOM (Weather-O-meter).

The WOM performs an accelerated aging test according to the NFT 30-049 standard, by means of a Xenon lamp and using a series of successive cycles including rain, damp heat, dry heat, freezing and thawing, sun exposure. 5 days in a cycle represent 1.5 year of natural outdoor aging in Paris.

TABLE 4

Influence of the anatase type $TiO_2$ content on hardness

| Persoz hardness (s) 400 μm fresh | Control composition | Composition 1 | Composition 2 | Composition 3 | Composition 4 |
|---|---|---|---|---|---|
| D + 1 | 26 | 29 | 33 | 39 | 42 |
| D + 6 | 28 | 31 | 34 | 40 | 43 |
| After 5 D WOM | 41 | 49 | 68 | 77 | 97 |

A substantial Persoz hardness variation of the films can be observed depending on the anatase type titanium dioxide contents, especially after an accelerated aging. Increasing the anatase type $TiO_2$ contents in the compositions tends to increase the film hardness, while reducing the filler content. As could be observed in the previous measures, adding to a composition 2.5% of anatase type titanium dioxide does not result in any substantial change of this characteristic. The hardness rises from +10 to +20% maximum.

Despite the high hardness of the films, no "cracking" was detected after the accelerated aging (WOM), even for the formula comprising 100% of anatase type titanium dioxide.

V. Influence on the Brightness

The brightness was evaluated according to the ISO 7668 standard using a gloss meter BRAIVE LMG064.

TABLE 5

Influence of the anatase type $TiO_2$ content on brightness

| Brightness 250 μm L2B | Control composition | Composition 1 | Composition 2 | Composition 3 | Composition 4 |
|---|---|---|---|---|---|
| 20° | 1.9 | 1.7 | 1.7 | 1.7 | 1.6 |
| 60° | 3.2 | 3.0 | 3.0 | 2.7 | 2.6 |
| 85° | 3.5 | 3.2 | 2.7 | 2.1 | 1.4 |

The most discriminating angle is the most razing angle (85°). Replacing rutile grade titanium dioxide with anatase type titanium dioxide results in a brightness loss which is characteristic of a relatively more porous surface. However, such property is expected so as to provide a wider contact surface between the anatase type $TiO_2$ and the ultraviolet radiation.

VI. Photocatalytic Degradation of the Paints

In order to demonstrate the interesting phenomenon, a chalking phenomenon quantification method was developed. When a paint is overexposed to the air and to the outer climatic conditions, the binder becomes damaged and a sort of powder forms on the surface. Such a phenomenon is called "chalking". This method advantageously distinguishes the formulations as to their photodegradation before/after the accelerated aging in WOM.

An adhesive tape (GPI) with a precise size (5×5 cm) is weighted on a precision balance, thereafter is intimately contacted with the surface of the paint film for 1 minute. After one minute, it is peeled off and weighted again. The degraded binder remains directly adhered to the adhesive film.

The table hereunder presents all the measures after climatic accelerated aging in the WOM (5 days for the normal cycle).

TABLE 6

Influence of the anatase type TiO₂ content on the photodegradation

| Chalking after 5 days in the WOM | Control composition | Composition 1 | Composition 2 | Composition 3 | Composition 4 |
|---|---|---|---|---|---|
| Weight of the residue on the adhesive tape (g) | 0.0007 | 0.0011 | 0.0016 | 0.0024 | 0.0044 |
| % of the control composition | 0 | +60% | +130% | +250% | +500% |

Figure 4:
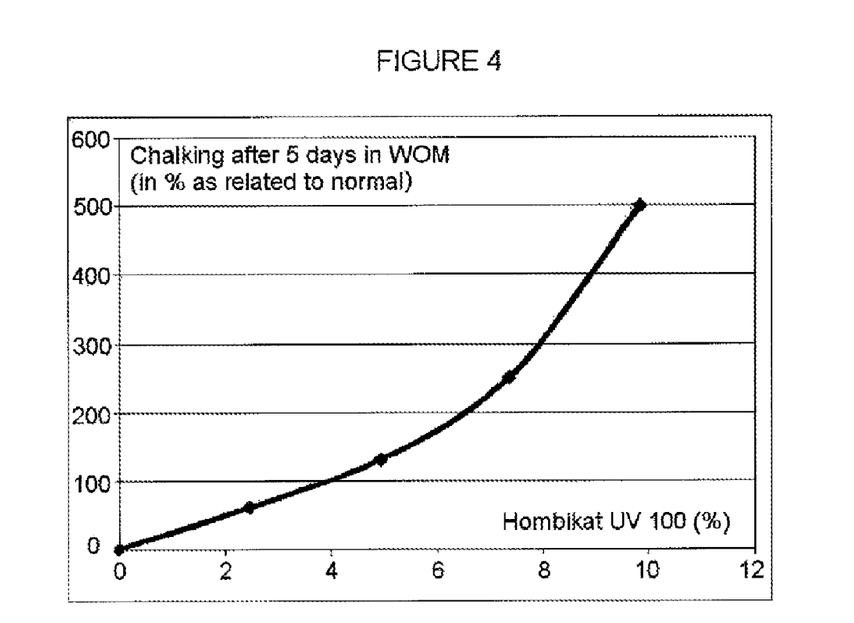

The binder photodegradation is observed with a composition comprising 2.5% of anatase type titanium dioxide. FIG. 4 illustrates the percentage of degraded binder of the control composition depending on the anatase type titanium dioxide content. The phenomenon varies depending on a quasi exponential law together with the anatase type TiO₂ amount.

Another assay was performed in the WOM, but with a cycle only comprising the lamp radiation without rain or damp heat. There could not be observed any difference between the various formulas. This demonstrates that the photocatalysis phenomenon not only requires anatase type TiO₂ and an ultraviolet radiation, but also requires water and O₂ directly contacting the catalyst.

VII. Impact on the Surface Tension

In order to quantify the super-hydrophily phenomenon of a film prepared from the composition, the measurement of the contact angle with the droplet has been adapted. The assay consisted in applying a water droplet using a tensiometer "Mobile Drop" from the Kruss company, then in measuring the contact angle between the droplet and the support by means of the dedicated software DSA2 from the Kruss company before and after the climatic accelerated aging in the WOM. Before the aging, the droplet angle is the same and is 72°.

TABLE 7

Influence of the TiO₂ content on the hydrophily

| After 5 days in WOM | Control composition 0 | Composition 1 | Composition 2 | Composition 3 | Composition 4 |
|---|---|---|---|---|---|
| Contact angle (°) | 69.1 | 31.4 | 29.6 | 0 | 0 |

Figure 5:
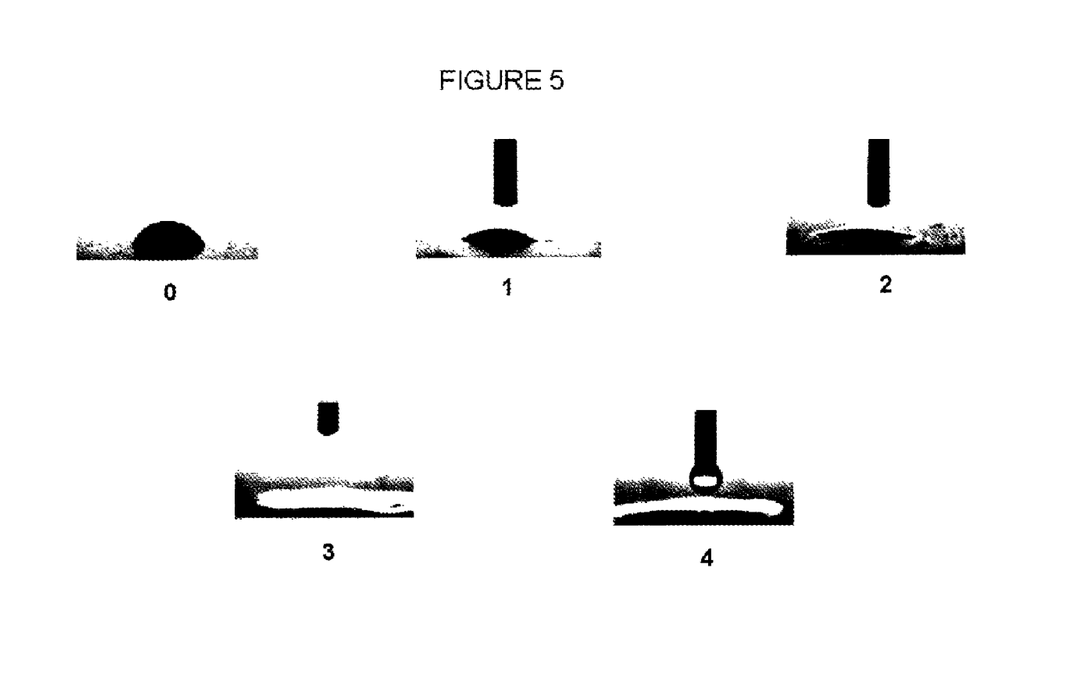

FIG. 5 represents photographs of the various supports comprising films of compositions 0 to 4 after the climatic accelerated aging in the WOM.

It can be clearly observed how the film surface state changed. Indeed, the smaller the droplet angle, the more the water (with a very high surface tension of 72 mN/m) tend to wet the support. Since the water surface tension does not change, this is necessarily the one of the support which increases. The film surface tends to less impede the water droplet spreading.

VIII. CONCLUSION

The assays did demonstrate that the road marking composition possesses an optimum viscosity with anatase type TiO₂ amounts, by weight of the composition total weight, lower than 6%, most preferably lower than 5%. These assays also showed that the composition has a good hiding power, even in a thin layer with anatase type TiO₂ amounts lower than or equal to 5%, as well as an excellent hiding power with anatase type TiO₂ amounts of 2.5%. Lastly, the photodegradation and hyperhydrophily phenomenon of the binder is observed with a composition comprising 2.5% of anatase type titanium dioxide.

A compromise may be found between these various properties with the following formula:

| | |
|---|---|
| Acrylic binder: 35.16% | Thickener: 0.02% |
| Anatase type TiO₂: 3.94% | Surfactant: 0.12% |
| Rutile type TiO₂: 10.79% | Dispersing agent: 0.52% |
| Fillers: 40.37% | Water: 2.53% |
| Coalescing agent: 2.08% | Ethanol: 4.16% |
| Antifoaming agent: 0.31% | |

The invention claimed is:

1. A road marking composition comprising by weight, based on the composition total weight:
    from 5 to 40% of an organic base binder comprising a resin selected from homopolymers or copolymers derived from vinylic, acrylic or methacrylic monomers, natural or synthetic resins that are soluble in alcohol or in optionally modified oils, plant derivative resins, cellulose resins, petroleum resins, coumarone-indene resins, polyureas, polyesters, polyethers, aminoplast resins, phenoplasts, and epoxy esters, except alkyd resins,
    from 10 to 40% of pigments, and
    from 10 to 60% of fillers,
    wherein from 2 to 75% of the pigment total content is crystallized titanium dioxide in anatase form, and the road marking composition has hyperhydrophilic and renewable surface properties.

2. The road marking composition according to claim 1, wherein anatase titanium dioxide represents by weight, based on the pigment total weight, from 10 to 40%.

3. The road marking composition according to claim 1, wherein the organic base binder is in an organic solvent phase.

4. The road marking composition according to claim 1, wherein the filler total amount by weight, based on the composition total weight is higher than or equal to 50%.

5. The road marking composition according to claim 1, wherein the solid matter content, by weight, based on the composition total weight is higher than 60%.

6. The road marking composition according to claim 1, wherein the titanium dioxide in the anatase form represents by weight, based on the pigment total weight from 20 to 30%.

7. The road marking composition according to claim 1, wherein the filler total amount by weight, based on the composition total weight is ranging from 50% to 60%.

8. The road marking composition according to claim 1, wherein the solid matter content, by weight, based on the composition total weight is ranging from 70 to 80%.

9. The road marking composition according to claim 1, wherein the amounts by weight of the crystallized titanium dioxide in the anatase form based on the composition total weight is lower than 6%.

10. The road marking composition according to claim 1, wherein the amounts by weight of the crystallized titanium dioxide in the anatase form based on the composition total weight is lower than 5%.

11. The road marking composition according to claim 1, wherein the composition comprises a mixture of crystallized titanium dioxide in the anatase form and of crystallized titanium dioxide in rutile form.

12. The road marking composition according to claim 11, wherein the amounts by weight of crystallized titanium dioxide in the rutile form based on the composition total weight range from 5 to 22%.

13. The road marking composition according to claim 11, wherein the amounts by weight of the crystallized titanium dioxide in the rutile form based on the composition total weight range from 9 to 18%.

14. The road marking composition according to claim 1, wherein the organic base binder is in a water phase.

15. The road marking composition according to claim 14, wherein the organic base binder is an emulsion comprising at least one acrylic polymer.

16. The road marking composition according to claim 1, wherein the composition comprises by weight, based on the composition total weight:
from 30 to 40% of an organic base binder,
from 10 to 25% of pigments,
from 35 to 45% of fillers.

17. The road marking composition according to claim 16, wherein the composition comprises by weight, based on the composition total weight from 10 to 20% of pigments.

18. A road marking product comprising:
a) a composition according to claim 1,
b) microbeads and/or anti-skid materials.

19. A road marking product comprising:
a) a composition comprising by weight, based on the composition total weight:
from 10 to less than 40% of an organic base binder comprising a resin selected from homopolymers or copolymers derived from vinylic, acrylic or methacrylic monomers, natural or synthetic resins that are soluble in alcohol or in optionally modified oils, plant derivative resins, cellulose resins, petroleum resins, coumarone-indene resins, polyureas, polyesters, polyethers, aminoplast resins, phenoplasts and epoxy esters, except alkyd resins,
from 10 to 40% of pigments wherein from 2 to 75% of the pigment total content is crystallized titanium dioxide in anatase form, and
from 10 to 60% of fillers; and
b) microbeads and/or reflective beads and/or anti-skid materials,
wherein the road marking composition has hyperhydrophilic and renewable surface properties.

* * * * *